Patented Oct. 28, 1947

2,429,839

UNITED STATES PATENT OFFICE 2,429,839

DIARYL-DICHLORO-ETHYLENE COMPOUNDS AS INSECTICIDES

Paul Müller, Neu-Allschwil, near Basel, Switzerland, assignor to the firm J. R. Geigy A. G., Basel, Switzerland No Drawing. Application June 11, 1943, Serial No. 490,518. In Switzerland August 22, 1942

6 Claims. (Cl. 167—30)

It is known to use condensation products obtainable from 1 molecule of chloral or bromal and two molecules of compounds containing replaceable hydrogen for the purpose of combatting injurious insects of all kind.

I have now found that dihalogeno-ethylene compounds which may be produced from the above-mentioned condensation products by splitting off 1 molecule of hydrogen halide, e. g. by boiling the said condensation products with alcoholic caustic potash lye or by halogenating the corresponding ethylene compounds, also possess an excellent insecticidal efficiency which, in certain cases, is superior to that of the trihalogen ethane compounds.

The dihalogeno-ethylene compounds are thus suitable in such cases where the insecticides of the trichloro-ethane group already known are insufficiently active.

The present invention will be illustrated by the following examples, wherein the parts are by weight, unless otherwise stated.

Example 1

Diphenyl-dichloro-ethylene which may easily be obtained from diphenyl-trichloro-ethane by boiling for 1 to 2 hours with alcoholic caustic potash lye or by chlorinating the asymmetrical diphenyl-ethylene according to Hepp, Ber. der deutschen chemischen Gesellschaft 7, 1411, kills flies with certainty, when per cubic metre room 5 ccm. of a 5% alcoholic solution thereof is sprayed. The death takes place, for flies, within 2–3 hours; already after 10–15 minutes nearly all of the flies are paralyzed in such a manner that they can no more fly. Moths, plant-lice or other pests are also annihilated within a very short time by the sprayed compound. Instead of solutions in alcohol, petroleum or similar solvents one may, in many cases, also successfully use aqueous emulsions. Thereby their efficacy does not decrease even on a long storage, which is the case for many known insecticide preparations. The compound mentioned can also be used in a solid form, as it possesses a sufficient volatility, but has only a weak and not at all disagreeable odor. Therefore, it may be used for the preparation of solid moth-proofing agents such as for example moth-balls, and, of course, also in combination with compounds already employed for the same purpose. Moreover, this compound is also suitable as food poison when either mixed with inert substances or with other agents suitable for combatting pests already known.

The diphenyl dibromo ethylene also shows the same effect.

Example 2

4:4'-dichloro- or -dibromo-diphenyl-dichloro-ethylene as well as 4:4'-dimethyl-diphenyl-dichloro-ethylene or 4:4'-dimethyl-diphenyl-dibromo-ethylene, which can also be prepared according to the process indicated in Example 1, have been proved efficacious insecticidal compositions of matter when they are used in the above concentrations. The first known compound is especially suitable for combatting ants, in which respect the corresponding trichloro-ethane compound does not always fully satisfy.

Example 3

4-chloro-diphenyl-dichloro- or -dibromo-ethylene or the analogous tolyl-phenyl compounds which may be prepared, as is partly known, from the corresponding trihalogeno-ethane compounds by splitting off hydrogen halide, possess also an excellent insecticidal efficacy, when used in a dissolved or emulsified condition or in powdered form.

Example 4

485 parts of red clay bole are impregnated with a solution of 15 parts of p:p'-dichloro-diphenyl-dichloro-ethylene in 300 parts of chloroform. The paste is dried under stirring in vacuo and subsequently finely ground. Thus 500 parts of a pulverulent agent are obtained which product is adapted to fully replace the rotenone preparations with respect to their efficiency. Moreover, it is also possible to add wetting and adhesive agents.

Example 5

485 parts of magnesia usta (magnesium oxide) are impregnated with a solution of 15 parts of 4:4'-dimethyl-diphenyl-dichloro-ethylene in 300 parts of alcohol. The paste so-obtained is dried and ground. Thus a pulverulent agent of good insecticidal efficiency is obtained.

Example 6

850 parts of lime carbonate and 100 parts of bentonite are impregnated with a solution of 50 parts of 4:4'-dichloro-diphenyl-dichloro-ethylene in 450 parts of alcohol and the mixture thus obtained is dried in vacuo while thoroughly stirring. The dried powder is intermixed with 50 parts of casein, 22 parts of sodium carbonate and 30 parts of a solid wetting agent, e. g., of a fatty alcohol sulfonate, and finely powdered.

The finished mixture gives, when diluted with water, a well adhering and well wetting spray liquor reacting on insects as food-poison and also as contact poison.

Example 7

15 parts of 4:4'-dimethyl-diphenyl-dichloro- or -dibromo-ethylene are dissolved in a mixture of 30 parts of toluene and 15 parts of methylhexaline, whereupon 40 parts of soft soap are added thereto. Heating is carried out until the mixture is clearly dissolved. 1–2% solutions of this mother-emulsion kill insects, on spraying, after a short time.

Example 8

12.5 parts of 4:4'-dibromo-diphenyl-dichloro-ethylene are dissolved in a mixture of 25 parts of toluene and 12.5 parts of methylhexaline and added to 10 parts of a quaternary wetting agent, e. g., of the following formula

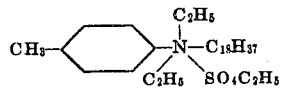

On vigorously stirring, a dark solution is obtained which may be diluted in any proportion with water. The diluted solutions are milky and kill insects already in a weak concentration. Of course, it is also possible to add the solution of an active substance into a diluted solution of the cation-active soap, whereby a suspension is formed.

Example 9

25 parts of 4:4'-dichloro-diphenyl-dichloro-ethylene are dissolved in a mixture of 50 parts of toluene and 25 parts of methylhexaline and suspended, while stirring, in a solution of 100 parts of fatty alcohol sulfonate in 200 parts of water prepared in the warmth. The viscous mass, becoming solid in the cold, yields on adding water a milky emulsion which possesses strong insecticidal properties even when greatly diluted. Emulsions may also be produced in an analogous manner by means of isopropyl-naphthalene-sulfonic acids or other wetting agents.

Example 10

12.5 parts of diphenyl-trichloro-ethylene are dissolved in a mixture of 25 parts of toluene and 12.5 parts of methylhexaline and added, under thoroughly stirring, to 500 parts of a 10% solution of sodium alginate. A thick milky turbid mass is obtained which may be diluted with water thus giving a milky emulsion. Instead of alginic acid there may also be used glue, caseine or albumin decomposition products in suitable concentrations. Of course, also mixtures of wetting and emulgating agents in any combination can be used.

Instead of the dihalogeno-ethylene derivatives used in the above examples the following compounds may also be used with the same success:

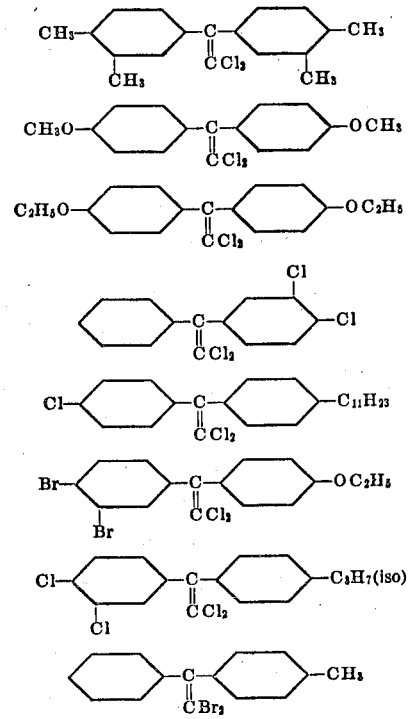

The production of these compounds is carried out, as indicated in Example 1, by splitting off hydrogen halide from the corresponding trihalogeno-ethyl compounds.

What I claim is:

1. A method of destroying insects which comprises applying to the insects an insecticidal composition of matter, an active toxic ingredient of which is a compound of the formula

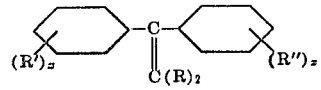

wherein R stands for a member selected from the group consisting of chlorine and bromine, each of R' and R'' stands for a member selected from the group consisting of hydrogen, chlorine, bromine, alkyl and alkoxy, and $x$ stands for one of the integers 1 and 2.

2. A method of destroying insects which comprises applying to the insects an insecticidal composition of matter, an active toxic ingredient of which is a compound of the formula

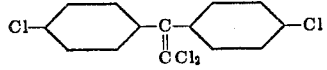

3. An insecticidal composition of matter containing as an active toxic ingredient a compound of the formula

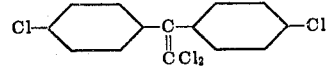

and a carrier therefor in the form of a powder.

4. An insecticidal composition of matter containing as an active toxic ingredient a compound of the formula

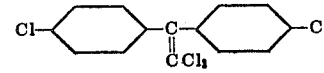

and a carrier therefor in the form of an emulsion.

5. An insecticidal composition of matter containing as an active toxic ingredient a compound of the formula

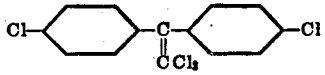

and a carrier therefor in the form of a petroleum solvent.

6. An insecticidal composition of matter containing as an active toxic ingredient a compound of the formula

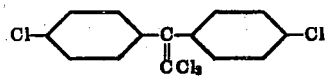

and a carrier therefor selected from the group consisting of powder, petroleum solvent, and aqueous emulsion.

PAUL MÜLLER.

REFERENCES CITED

The following references are of record in the file of this patent:

Beilstein 4th ed., volume 5, page 639.